Patented June 18, 1940

2,204,888

UNITED STATES PATENT OFFICE 2,204,888

PROCESS FOR GENERATING CHLORINE AND PRODUCTION OF VALUABLE BYPRODUCTS

Elmer E. Dougherty, Glen Ridge, N. J.

No Drawing. Application September 28, 1936, Serial No. 102,973

3 Claims. (Cl. 23—219)

This invention relates to a process for generating chlorine and the production of valuable byproducts.

The object of my invention is to produce elemental chlorine from what may be otherwise considered waste material or byproducts from various chemical and metallurgical operations and, at the same time, incidentally produce a byproduct tha may be useful for various purposes.

In carrying out my process, an initial batch is prepared in which sodium chloride is used as the source of chlorine but in all subsequent operations calcium chloride is used, except in some instances where byproduct hydrochloric acid is available.

Most of the chlorine produced today is a byproduct in the electrolysis of sodium chloride for the production of caustic soda. However, the demand for chlorine is outstripping the demand for caustic soda and this process has been developed as a method of producing the requisite quantity of chlorine to meet this increasing demand.

This process, comprising my invention, among other features, is believed to be an improvement on the well known "Weldon process". The calcium chloride formed in the regeneration of the "Weldon mud", which has heretofore been run to waste, is saved and utilized. Not only is the chlorine radical recovered but also the base is converted to a salable product for which there is an extensive market.

In my process no soda compounds are produced to compete with an already competitive market. One byproduct, calcium sulphate, is easily disposed of as the market for the same is quite extensive. It may be used for paper filler, plaster of Paris, Keene's cement and in various other products.

Manganese oxide is used in the generation of chlorine, as in the "Weldon process", except that where the "Weldon process" starts with manganese dioxide and thereafter uses the "Weldon mud", my process uses manganese dioxide for the initial and all subsequent batches. Low grade oxides, regardless of degree of oxidation, may be used as raw material. This is also true of the hydroxides, carbonates, sulphates and chloride of manganese, etc. Even recovered manganese and impure ores may be used.

Chloride of calcium from the "Solvay process", metallurgical processes and other sources may be used. Also, byproduct hydrochloric acid recovered from chlorination of organic compounds may be used. When possible to recover the latter as acid, it is advantageous, as will be seen from the description of the process hereinafter. Otherwise, as in the preparation of aniline, it is recovered as calcium chloride.

Almost any manganese ore, such as braunite ($Mn_2O_3$), hausmannite ($Mn_3O_4$), rhodochrosite ($NnCO_3$), etc., may be used as the source of the essential manganese. The same is true of recovered and byproduct manganese compounds, such as "Weldon mud", various hydroxides, chlorides, sulphates, manganates, etc., but before the manganese reacts with hydrochloric acid it is converted to the black oxide, $MnO_2$, which is known to give the largest yield of elemental chlorine.

An important step of this process is the conversion of manganese oxides of indefinite oxygen content to the very definite compound, manganese dioxide. This compound may be used over and over again, or may be recovered and marketed as such, in which event it becomes another valuable byproduct.

If the manganese dioxide is recovered and used over again, all of the calcium radical and sulphuric acid entering the process are converted to and recovered as calcium sulphate, $$CaSO_4 + 2H_2O.$$

All of the hydrochloric acid radical is recovered as elemental chlorine.

Any sulphate capable of exchanging its acid radical with the chlorine radical of the calcium chloride, with the incidental formation of the water insoluble calcium sulphate or gypsum, $CaSO_4 + 2H_2O$, may be used, but in the illustration I will use sodium chloride as the starting salt and sodium sulphate as the circulating salt.

The following is illustrative of the several steps in carrying out my process:

*First step*

Sodium chloride is transformed by sulphuric acid to sodium sulphate and hydrochloric acid. The hydrochloric acid is condensed in a tower, etc., in the usual manner. The sodium sulphate or salt cake is withdrawn from the furnace and dissolved in water. The following is the reaction involved:

$$2NaCl + H_2SO_4 = Na_2SO_4 + 2HCl$$

*Second step*

In preparing the manganese dioxide, (a) take 60% of the necessary manganese bearing material, such as manganese hydroxide, and convert to manganous sulphate ($MnSO_4$). (b) The remaining 40% is converted to calcium manganate in a suitable furnace, leached and then (c) by transposition converted to sodium permanganate. The following are the reactions involved:

(a) $Mn(OH)_2 + H_2SO_4 = MnSO_4 + 2H_2O$
(b) $2Mn(OH)_2 + CaO + H_2O + 2NaOH + 2O_2 =$
$CaMnO_4 + Na_2MnO_4 + 4H_2O$
(c) $CaMnO_4 + Na_2MnO_4 + CO_2 + O =$
$2NaMnO_4 + CaCO_3$

*Third step*

By adding the sodium permanganate and manganese sulphate in correct molecular proportion, all of the manganese is precipitated as black manganese oxide, $MnO_2$, with the incidental production of sodium sulphate and free sulphuric acid. Filter off the manganese dioxide and wash, when it is to be used for the following or fourth step. The filtrate containing sodium sulphate and sulphuric acid is concentrated and used for making a new batch of manganous sulphate, as in the second step. The following is the reaction involved:

$2NaMnO_4 + 3MnSO_4 + 2H_2O =$
$5MnO_2 + Na_2SO_4 + 2H_2SO_4$

*Fourth step*

The manganese dioxide obtained in the third step is reacted with the hydrochloric acid obtained in the first step, in suitable apparatus, with the result that manganous chloride and chlorine are formed. The chlorine is dried and condensed (by well known means) or used on the premises as a concentrated dry gas. The residual manganous chloride solution is treated as in the fifth step. The following is the reaction:

$MnO_2 + 4HCl = MnCl_2 + 2H_2O + Cl_2$

*Fifth step*

The addition of calcium hydroxide to the solution of manganese chloride results in the formation of manganous hydroxide, which is precipitated, and dilute solution of calcium chloride. The precipitated manganese hydroxide is filtered and washed and used as in the second step. The calcium chloride solution goes to the next or sixth step. The following is the reaction involved:

$MnCl_2 + Ca(OH)_2 = CaCl_2 + Mn(OH)_2$

*Sixth step*

The sodium sulphate obtained in the first step is added to the calcium chloride obtained in the fifth step, plus enough new calcium chloride from other sources to react with all of the sodium or other sulphate available. This will result in the formation of the insoluble calcium sulphate, $CaSO_4 + 2H_2O$, and water soluble sodium or other chloride. Filter and wash the calcium sulphate precipitate, which may be marketed as such, or by further processing converted to plaster of Paris, Keene's cement, etc. The filtrate containing the water soluble chloride is concentrated and the recovered salts used as in the first step. This completes the cycle of operations. The following reaction is involved in this sixth step:

$Na_2SO_4 + CaCl_2 + 2H_2O = 2NaCl + CaSO_4 + 2H_2O$

Although sodium chloride is utilized in the foregoing reactions, it will be understood that any chloride may be used that will produce a water soluble sulphate capable of precipitating the water insoluble calcium sulphate and, incidentally, produce a water soluble chloride that may be used again. For instance, in the first step:

$ZnCl_2 + H_2SO_4 = ZnSO_4 + 2HCl$
$MgCl_2 + H_2SO_4 = MgSO_4 + 2HCl$

Instead of two steps, as set out in the first and fourth steps, in the generation of the chlorine:

$4NaCl + 2H_2SO_4 = 2Na_2SO_4 + 4HCl$
$MnO_2 + 4HCl = MnCl_2 + 2H_2O + Cl_2$

It will be understood that the same result may be obtained in one step, as:

$MnO_2 + 4NaCl + 2H_2SO_4 =$
$MnCl_2 + 2Na_2SO_4 + 2H_2O + Cl_2$

Various other modifications may be used in bringing about the same result.

Although carbon dioxide is specified as the precipitant of the calcium in the mixed calcium and sodium manganates and subsequent formation of permanganates, other reagents may be used for the same purpose, such as phosphoric acid, hydrofluosilicic acid, sulphuric acid, etc., care being taken, of course, to use only sufficient for the purpose. Using sulphuric acid as an illustration, the following will be the reaction:

$CaMnO_4 + Na_2MnO_4 + O + H_2SO_4 + H_2O =$
$CaSO_4 + 2H_2O + 2NaMnO_4$

What I claim as new and desire to secure by Letters Patent is:

1. A cyclic process of producing elemental chlorine and a byproduct which comprises reacting calcium chloride in solution with an equivalent amount of a water soluble sulphate capable of exchanging its acid radical with the chlorine radical of the calcium chloride, filtering off the precipitated calcium sulphate, evaporating the water from the resulting chloride solution, reacting the said resulting chloride with an equivalent amount of sulphuric acid by heating in a suitable furnace to produce gaseous hydrochloric acid and a water soluble sulphate, returning the said sulphate to the first step for further reaction with calcium chloride, reacting the hydrochloric acid solution with an equivalent amount of manganese dioxide in a suitable vessel by heating, collecting the evolved chlorine, reacting the resulting manganous chloride with an equivalent amount of calcium hydroxide, separating the precipitated manganous hydroxide by filtering and washing, returning the calcium chloride formed to the said chloride production step for reaction with the water soluble sulphate, reacting a part of the manganous hydroxide with sulphuric acid to produce a neutral manganous sulphate, mixing the balance of the manganous hydroxide with an equivalent amount of a mixture of approximately equal molecular proportions of calcium hydroxide and alkali hydroxide in a suitable furnace, heating in the presence of oxygen to form a mixture of two manganates, dissolving the mixed manganates in water, reacting with carbon dioxide to precipitate the calcium as carbonate, reacting the resulting permanganate with the manganous sulphate, filtering off and washing the precipitated manganese dioxide, reacting with additional hydrochloric acid in the further production of chlorine and using the solution of the sulphate and sulphuric acid in conjunction with additional sulphuric acid for further reaction with additional chloride in the further production of hydrochloric acid.

2. A cyclic process for producing elemental chlorine and a byproduct which comprises reacting calcium chloride with an equivalent amount of sodium sulphate in solution, filtering off the precipitated calcium sulphate, evaporating the water from the sodium chloride solution, reacting the said sodium chloride with an equivalent amount of sulphuric acid by heating in a suitable furnace to produce gaseous hydrochloric acid and sodium sulphate, collecting the evolved gas in water, returning the said sodium sulphate to the first step for further reaction with calcium chloride in solution, reacting the hydrochloric acid solution with an equivalent amount of manganese dioxide by heating in a suitable vessel, collecting the evolved chlorine, reacting the resulting manganous chloride with an equivalent amount of calcium hydroxide, separating the precipitated manganous hydroxide by filtering and washing, returning the calcium chloride formed to the said sodium chloride production step for reaction with sodium sulphate, reacting a part of the manganous hydroxide with sulphuric acid to produce a neutral manganous sulphate, mixing the balance of the manganous hydroxide with an equivalent amount of a mixture of approximately equal molecular proportions of calcium hydroxide and sodium hydroxide in a suitable furnace, heating in the presence of oxygen to produce a mixture of calcium and sodium manganates, dissolving the mixed manganates of calcium and sodium in water, reacting with carbon dioxide to precipitate the calcium carbonate, reacting the resulting sodium permanganate with the manganous sulphate, filtering off and washing the precipitated manganese dioxide, reacting with additional hydrochloric acid, in the further production of chlorine, and using the solution of sodium sulphate and sulphuric acid in conjunction with additional sulphuric acid for further reaction with additional sodium chloride in the further production of hydrochloric acid.

3. A cyclic process for producing elemental chlorine and a byproduct which comprises reacting calcium chloride with an equivalent amount of sodium sulphate in solution, filtering off the precipitated calcium sulphate, evaporating the water from the sodium chloride solution, reacting the said sodium chloride with an equivalent amount of sulphuric acid by heating in a suitable furnace to produce gaseous hydrochloric acid and sodium sulphate, collecting the evolved hydrochloric acid in water, returning the sodium sulphate to the first step for further reaction with calcium chloride in solution, reacting the hydrochloric acid solution with an equivalent amount of manganese dioxide in a suitable vessel by heating, collecting the evolved chlorine, reacting the resulting manganous chloride with an equivalent amount of calcium hydroxide, separating the precipitated manganous hydroxide by filtering and washing, returning the calcium chloride formed to the sodium chloride production step for reaction with sodium sulphate, reacting 60% of the manganous hydroxide with sulphuric acid to produce a neutral manganous sulphate, mixing the remaining 40% of the manganous hydroxide with an equivalent amount of a mixture of approximately equal molecular proportions of calcium hydroxide and sodium hydroxide in a suitable furnace, heating in the presence of oxygen to form a mixture of calcium and sodium manganates, dissolving the mixed manganates of calcium and sodium in water, reacting with carbon dioxide to precipitate the calcium as carbonate, reacting the resulting sodium permanganates with the manganous sulphates, filtering off and washing the precipitated manganese dioxide, reacting with additional hydrochloric acid in the further production of chlorine, and using the solution of sodium sulphate and sulphuric acid in conjunction with additional sulphuric acid for further reaction with additional sodium chloride in the further production of hydrochloric acid.

ELMER E. DOUGHERTY.